United States Patent [19]

Holtkamp

[11] 4,343,109

[45] Aug. 10, 1982

[54] CAPILLARY DISC AND SUPPORT THEREFOR

[76] Inventor: Reinhold Holtkamp, Werther Strasse 112, 4294 Isselburg, Fed. Rep. of Germany

[21] Appl. No.: 205,989

[22] Filed: Nov. 12, 1980

[51] Int. Cl.³ .............................................. A01G 27/00
[52] U.S. Cl. ............................................ 47/81; 47/39
[58] Field of Search ...................................... 47/79–81, 47/66, 71, 39; 118/268–270; 239/44

[56] References Cited

U.S. PATENT DOCUMENTS

| | | | |
|---|---|---|---|
| 1,264,096 | 4/1918 | Lelievre | 47/81 |
| 1,342,786 | 6/1920 | White | 47/81 |
| 2,346,029 | 4/1944 | Jennings | 47/81 |
| 3,220,144 | 11/1965 | Green | 47/80 |
| 3,298,133 | 1/1967 | Courtright | 47/81 X |
| 3,576,088 | 4/1971 | Arca | 47/81 |
| 3,753,315 | 8/1973 | Adam | 47/80 |
| 3,769,748 | 11/1973 | Goldring | 47/80 |
| 3,775,904 | 12/1973 | Peters | 47/80 |
| 4,096,663 | 6/1978 | Silver | 47/80 |

FOREIGN PATENT DOCUMENTS

| | | | |
|---|---|---|---|
| 1468863 | 1/1967 | France | 47/81 |
| 1544194 | 9/1968 | France | 47/81 |
| 10693 | of 1908 | United Kingdom | 47/80 |
| 1200457 | 7/1970 | United Kingdom | 47/81 |

*Primary Examiner*—Robert E. Bagwill
*Attorney, Agent, or Firm*—Schwartz, Jeffery, Schwaab, Mack, Blumenthal & Koch

[57] ABSTRACT

A watering device for potted plants comprising a support disc and a plurality of legs extending downwardly froom the disc so as to elevate said disc from the bottom of a tray. A pad is positioned on said disc, with the pad having a hinged movable tab which can be bend downwardly through an opening formed in the disc for submergence in the water in the tray. Thus, water is transmitted by capillary action from said tab to and uniformly throughout said pad for providing water to a pot positioned on said pad.

5 Claims, 4 Drawing Figures

CAPILLARY DISC AND SUPPORT THEREFOR

BACKGROUND OF THE INVENTION

The present invention relates as indicated to a capillary disc and support therefor, and relates more particularly to a disc and support adapted to be used in a flower pot environment to improve the transfer of water from a tray or the like to the pot and thus the growing media by means of capillary action.

The utilization of capillary action to transfer moisture or water to growing media in pots is of course well known. The prior art is replete with various structures in which capillary action is employed for watering purposes. In U.S. Pat. No. 2,346,029 to Jennings, for example, a pot is shown supported above the bottom of a water-containing tray, and in one form of the invention of Jennings, a plurality of wicks extend downwardly along the sides of the pot and then through a single central opening in the bottom of the pot into contact with the water below the pot. While this arrangement might be satisfactory for plant material requiring considerable amounts of moisture, plant material, such as african violets, requiring relatively less water tend to be over-watered. Although one or more of the wicks extending along the sides of the pot can be eliminated, this necessarily results in the nonuniform movement of moisture into the interior of the pot, an obviously undesirable situation.

U.S. Pat. No. 3,769,748 to Goldring discloses a plant watering device in which the pot fits on a pad preferably formed of plastic material which in turn is immersed in a water bath confined by a surrounding tray. The pot is formed with one or more openings in the bottom thereof, and water is transmitted by capillary action from the tray through the plastic pad and sent through the openings in the pot to provide water for the growing media. The plastic pad is encased within an annular reinforcing ring the bottom edge of which is notched at a plurality of circumferentially spaced positions to permit communication of the water with the pad. The structure of the pad and supporting ring are designed to accommodate a specific size pot, making the water arrangement difficult to adapt to pots of varying size. Moreover, should the access openings through the supporting ring become clogged, water will be unable to pass from the tray to and through the pervious plastic pad for providing moisture at the top of the pad which contacts the bottom of the pot, which is of course pervious to moisture transmission.

SUMMARY OF THE INVENTION

An important feature of the present invention is to provide a simple and inexpensive capillary disc and support by means of which the bottom of a pot can be placed in moisture contact with the pad throughout subtantial of the entire area of the bottom of the pot. In accordance with the invention, the pad is highly pervious so as to transmit water from the reservoir into the pad, the dimensions of which are such that the entire bottom of the pot is in contact with the pad. The pad is preferably formed with a plurality of openings in the bottom wall by means of which the moisture is transmitted to the growing media. The openings are preferably spaced so as to provide uniform moisture transmission to the growing media.

A further important feature of the present invention is the novel structure and relationship of the pad and support. The support is provided with a preferably centrally located opening, and the pad is cut in an area aligned with such opening so as to provide a tab which can be bent downwardly into the water bath. In this manner, water is transmitted by means of the tab to the pad through capillary action, thereby watering the growing media. The dimensions of the tab and the size of the opening formed in the support are such that a suitable amount of water is transmitted through the tab to the pad for transfer to the growing media. If desired, the tab can be formed of a plurality of sections one or more of which can be struck or bent downwardly into the water bath so as to vary the amount of water transmitted by capillary action, thereby providing optimum watering condition for plants requiring various amounts of moisture. The support for the pad is preferably positioned above the level of water in the tray surrounding the pad and support so the water transmission is confined to water transmitted by capillary action through the tab. The pad and support are preferably positioned in a tray or the like, with the outer peripheries of the pad and support being spaced from the upper edges of the tray so that water can be added to the tray as necessary.

BRIEF DESCRIPTION OF THE APPLICATION DRAWINGS

DETAILED DESCRIPTION OF THE PREFERRED EMBODIMENTS

Figure 1:
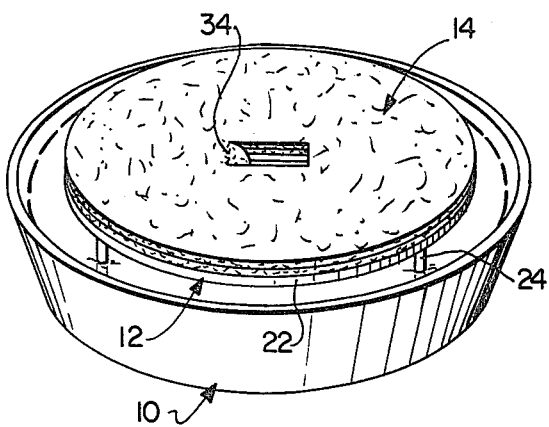
FIG. 1 is a perspective view of the pad and support, shown mounted in a tray.

Referring to the application drawings, wherein like parts are indicated by like reference numerals, a tray is generally indicated at 10, and positioned in the tray is a support generally indicated at 12, and a pad generally indicated at 14 positioned on the support. As shown in the application figures, both the pad and support are generally circular in configuration, although it will be understood that other shapes could as well be employed. The circular configuration is preferred, however, in view of the normally round bottom of a pot for plants, with the pot being generally indicated at 16 in FIG. 2. Although the tray 10 is shown with a flat bottom 18 and a continuous outwardly inclined side wall 20, the configuration of the tray forms no part of the present invention. However, the diameter of the upper edge of the wall 20 of the tray is preferably somewhat larger than the diameters of the support and pad so as to permit the pouring of water into the tray to maintain the water level WL at the desired level.

The support 12 includes a circular disc 22 which has integrally formed therewith or secured thereto a plurality of supporting legs commonly designated at 24. The legs 24 can vary in number as desired, although for reasons of economy in manufacture, the minimum number of three legs is desired for providing stable support for the disc 22. The legs 24 are preferably spaced circumferentially equidistantly, and are positioned well within the outer periphery of the support so as to accommodate without interference trays having more severely inclined walls than the walls shown in FIG. 2.

The support 12 is preferably formed of a plastic material, and the support can be economically manufactured by conventional injection molding or other molding techniques well known in the art.

Figure 2:
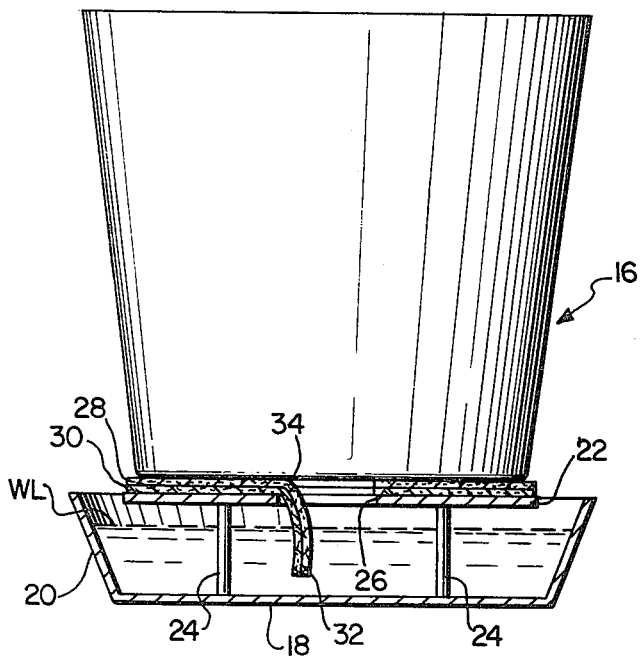
FIG. 2 is a vertical cross-sectional view, with the pot being shown in elevation, of the support and pad mounted in the tray.
Figure 4:
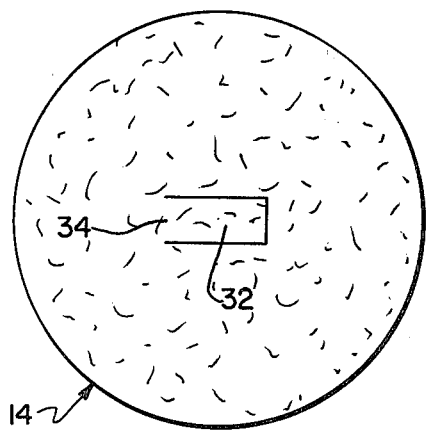
FIG. 4 is a top plan view of the pad, more clearly showing the centrally located tab which is adapted to be struck or turned downwardly and emerged into the water bath.

The disc 22 is formed with a centrally located slot 26 which in the form shown is generally rectangular in cross-section. The pad 14, which as shown comprises two separate layers 28 and 30, is cut in the central portion thereof so as to provide a tab 32 corresponding in shape to the slot 26 formed in the support disc. Thus, the tab 32 can be bent downwardly from the plane of the pad, for submergence in the water in the tray, as shown in FIG. 2. Although a single tab is shown in the application drawing, it will be understood that a plurality of tabs or tab sections could be provided so as to permit varying degrees of cross-sectional areas to be submerged in the water to consequently provide varying amounts of moisture transmission by capillary action. By such action, water is transmitted from the tab to the pad, substantially throughout the entire area thereof.

It will be noted that the tab is formed by a series of three separate cuts, with a hinge portion 35 connecting the tab to the remainder of the pad.

As above noted, the pad 14 must of course be pervious, and in the form shown comprises two separate layers 28 and 30. The pad materials are preferably selected so as to provide optimum moisture transference capabilities, and a plastic material, or a combination of plastic and wool have proven entirely satisfactory for this purpose. Where two pads are employed as illustrated, they are bonded together in selected areas as necessary to provide a unitary pad assembly. Although two separate layers are shown, it will be understood that a single layer of substantially the same thickness may alternately be provided.

Figure 3:
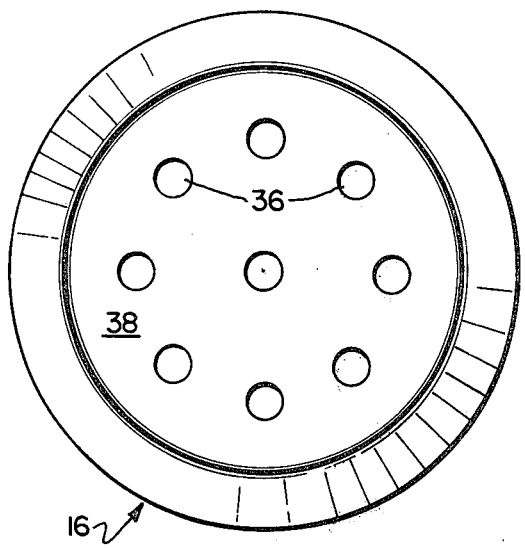
FIG. 3 is a top plan view of the pot by itself, showing the openings formed in the bottom thereof for transfer of moisture by means of capillary action.

Referring to FIG. 3, the pot 16 is illustrated therein as being provided with a plurality of openings commonly designated at 36 in the bottom wall 38 thereof, with such openings serving to transmit by capillary action the water from the pad 14 to the growing media. It will be further understood that the pot itself can be formed of a somewhat pervious material whereby capillary action effects transmission of the moisture directly through the thickness of the bottom wall 38 of the pot.

The assembly and operation of the support and disc should be apparent from the above description. The supports 12 can be shipped separately from the pads, and a support positioned within the tray 20. A pad 14 is been positioned on the support disc 22, with the tab 32 being preferably precut in the pad. The tab 32 is then bent downwardly so as to be submerged in the water poured into the tray 20. It will be noted that the support in FIG. 2 is positioned above the water level whereby the only means for transmission of water by capillary action is through the tab 32, with the water being uniformally transmitted to the pad for subsequent transmission by capillary action to the growing media.

Although the support disc and pad are shown having the same general diameter as the bottom of the pot, it will be understood that the support disc and pad may be smaller or larger in diameter than the pot without significantly detracting some of the advantages of the invention. However, the pad is preferably of a diameter sufficiently large to cover the plurality of openings formed in the bottom walls of the pot so as to provide maximum and uniform water transfer to the growing media. Although a plurality of openings 36 have been shown formed in the bottom wall of the pot, it will be understood that a single opening may be utilized if moisture transfer is sufficient, particularly if the bottom wall of the pot is pervious to moisture transfer. If a plurality of openings are provided, they may be spaced as desired, with uniform moisture transmission being the main criterion.

I claim:

1. A plant watering device comprising:
   (a) support means adapted to rest on the bottom of a tray or like water-containing vessel, said support means including a support disc and a plurality of legs extending downwardly from said disc and spaced inwardly from the edge thereof so as to elevate said disc from the bottom of the tray, said disc being formed with a substantially central opening therein, and
   (b) pad means constructed of water absorbent material positioned on said disc, said pad means having a movable tab hinged at one end thereof to said pad means and aligned with and commensurate in size with said opening in said disc, said tab being adapted to be bent downwardly through said opening in said disc for submergence in the water in the tray,
   whereby water is transmitted by capillary action from said tab to and uniformly throughout said pad for providing water to a pot having an apertured bottom positioned on said pad.

2. The watering device of claim 1 wherein said disc and said pad are of approximately the same shape.

3. The watering device of claim 2 wherein said pad and said disc are circular.

4. The watering device of claim 1 wherein said pad means comprises a pair of separate pad sections secured together, with both of said pads being of pervious material.

5. The watering device of claim 4 wherein the material of said pad sections is selected from the group comprising wool and plastic material.

* * * * *